US010077113B2

(12) United States Patent
Boudebiza et al.

(10) Patent No.: US 10,077,113 B2
(45) Date of Patent: Sep. 18, 2018

(54) ENGINE COWL INCORPORATING AN EQUIPMENT VENTILATION CIRCUIT

(71) Applicant: SAFRAN AIRCRAFT ENGINES, Paris (FR)

(72) Inventors: Tewfik Boudebiza, Paris (FR); Frederic Eichstadt, Melun (FR); Marc Tesniere, Champcueil (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 523 days.

(21) Appl. No.: 14/162,096

(22) Filed: Jan. 23, 2014

(65) Prior Publication Data

US 2014/0212279 A1   Jul. 31, 2014

(30) Foreign Application Priority Data

Jan. 23, 2013   (FR) ...................................... 13 50579

(51) Int. Cl.
*B64D 13/00* (2006.01)
*B64D 29/00* (2006.01)
*B64D 33/08* (2006.01)
*F01D 25/14* (2006.01)
*F02C 7/12* (2006.01)

(52) U.S. Cl.
CPC ........... *B64D 13/006* (2013.01); *B64D 29/00* (2013.01); *B64D 33/08* (2013.01); *F01D 25/14* (2013.01); *F02C 7/12* (2013.01); *Y02T 50/671* (2013.01); *Y02T 50/675* (2013.01)

(58) Field of Classification Search
CPC .................. B64D 13/006; B64D 29/00; B64D 2033/0226; B64C 21/06
See application file for complete search history.

(56) References Cited

U.S. PATENT DOCUMENTS 5,297,765 A * 3/1994 Hughes ................... B64C 21/06
244/130
5,806,793 A   9/1998 Brossier et al.
(Continued)

FOREIGN PATENT DOCUMENTS

DE   10 2008 027 275 A1   1/2010
EP      0 145 809 A1   6/1985
(Continued)

OTHER PUBLICATIONS

French Preliminary Search Report and Written Opinion dated Sep. 4, 2013, in Patent Application No. FR 1350579, filed Jan. 23, 2013 (with English Translation of Category of Cited Documents).

*Primary Examiner* — Mark Laurenzi
*Assistant Examiner* — Shafiq Mian
(74) *Attorney, Agent, or Firm* — Oblon, McClelland, Maier & Neustadt, L.L.P.

(57) ABSTRACT

An aircraft propulsion engine including a fan case, and a cowl forming part of the nacelle of the engine and being designed to at least partially surround the case leaving a space between the cowl and the case, in which space at least one piece of equipment is mounted and extends along the axis of the engine, is provided. The cowl includes a wall and wall stiffeners fixed to the internal face of the wall. At least a part of the stiffeners of the cowl is arranged to form air guide ducts, the air guide ducts being assembled into an air distribution circuit to ventilate the equipment.

7 Claims, 1 Drawing Sheet

(56) References Cited

U.S. PATENT DOCUMENTS

| | | | |
|---|---|---|---|
| 2010/0133380 A1* | 6/2010 | Roebroeks | B32B 15/08 244/119 |
| 2010/0212286 A1* | 8/2010 | West | F02K 1/32 60/226.2 |
| 2012/0217320 A1* | 8/2012 | Vauchel | F02K 1/72 239/265.19 |

FOREIGN PATENT DOCUMENTS

| | | | |
|---|---|---|---|
| EP | 0145809 B1 * | 11/1987 | B64D 27/18 |
| GB | 2 302 371 A | 1/1997 | |
| GB | 2 308 159 A | 6/1997 | |

* cited by examiner

U.S. Patent     Sep. 18, 2018     US 10,077,113 B2
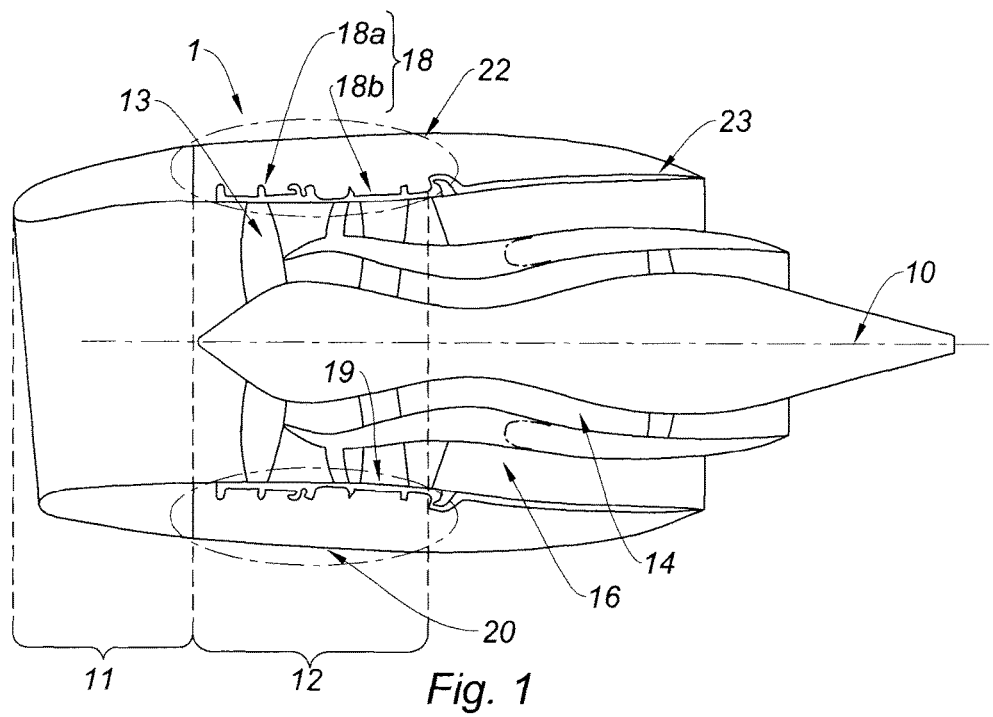
Fig. 1
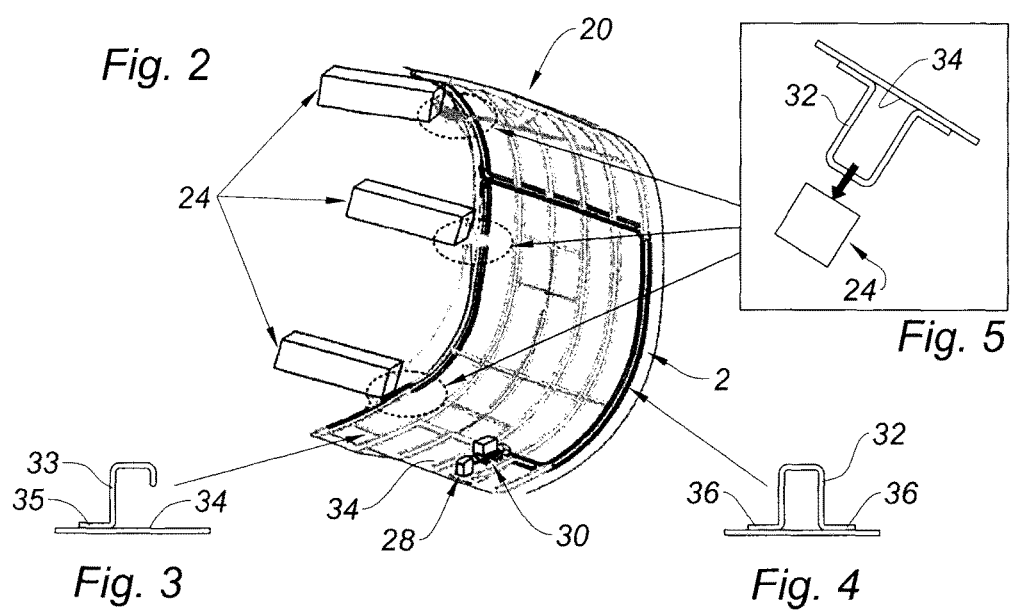
Fig. 2
Fig. 3
Fig. 4
Fig. 5

ENGINE COWL INCORPORATING AN EQUIPMENT VENTILATION CIRCUIT

The invention relates to a cowl that forms part of an engine nacelle, the cowl being designed to surround a case, notably a fan case of a multiple-flow engine for propelling an aircraft, and extend along the axis of the engine. The invention also relates to a multiple-flow engine comprising a case, notably a fan case, and the cowl.

BACKGROUND OF THE INVENTION

An aircraft propulsion engine comprises auxiliary equipment which is mounted on its case and performs a certain number of functions connected with the ancillaries of the engine or of the aircraft. Thus, a multiple-flow turbojet engine is generally fitted with a thrust reverser formed, for example, of flaps or doors which bear against the fan case and the flap or door drive mechanism of which is housed in the annular space situated between the case and the cowl of the nacelle. This mechanism comprises a plurality of flap drive actuators, distributed around the case and oriented in the longitudinal direction.

Despite their peripheral positioning, adjacent to the exterior wall, the thrust reverser actuators are, in operation, subjected to temperatures which are liable to exceed those permitted by this equipment. This problem notably arises when taxiing when the airplane is being maneuvered on the ground. Specifically, whereas the equipment is sufficiently ventilated when the aircraft is in flight, on the ground the volume of air circulating around the equipment is not enough to perform this function.

The problem of cooling also affects the other equipment present in this annular space, such as on-board computers or processors of the EEC type, the function of which is notably to control the actuators of the engine to optimize the performance thereof.

It is known practice to ventilate this equipment by circulating cooling air around the affected equipment using a system of ducting placed on the case and supplied by an air circulation blower or even by bleeding air from the upstream part of the nacelle. Suitable diffusers are arranged in the zones that are to be ventilated. This then solves the problem of cooling the equipment when that is necessary.

However, these technical solutions add parts that have to be mounted within the engine environment. They make the engine heavier and complicated to assemble. Moreover, it should be noted that the empty space in the fan cowl zone is very confined and very cluttered. It would therefore seem desirable to reduce the volume of and to simplify the system that ventilates this equipment, namely the blower, the ducting, mounts and diffuser.

The applicant has set itself the objective of developing an improved ventilation system which combines the following properties: effective cooling, lightness of weight, low cost, compact volume.

OBJECT AND SUMMARY OF THE INVENTION

The invention therefore proposes to meet the needs associated with compactness and overall weight saving of multiple-flow engines, and to do so from the standpoint of onboard mass and number of elements to be assembled within the cowls.

This object is achieved according to the invention using an aircraft propulsion engine comprising a case, notably a fan case, a cowl forming part of the nacelle of the engine, the cowl being designed to at least partially surround the case leaving a space between the cowl and the case, in which space at least one piece of equipment is mounted and extends along the axis of the engine, the cowl comprising a wall and wall stiffeners fixed to the internal face of this wall, the engine being one wherein at least a part of the stiffeners of the cowl is arranged to form air guide ducts, the air guide ducts being assembled into an air distribution circuit to ventilate the equipment.

The advantage of this engine lies in the use of some of the cowl stiffeners to distribute the air within this cowl. The structure of the engines employing this solution therefore become simplified and more space becomes available under the cowl.

Advantageously, the stiffeners have a cross section with an air guiding part and flanges for attaching to the wall. The stiffeners are joined together to form an air distribution circuit. The hollow profile of these stiffeners allows them to guide the air needed for the required ventilation function.

More specifically, the air guiding part collaborates with the wall of the cowl to form an air guide duct. Thus, the wall of the cowl is able to contribute to sealing the stiffeners that form air guide ducts. It is thus conceivable to use stiffeners the profile of which is a hollow, but not a closed, profile.

According to one advantageous embodiment, the stiffeners have an omega-shaped cross section or cross section of any other shape that allows an air flow to circulate with a central air-guiding part and lateral flanges for attaching to the wall.

According to another feature, the distribution circuit comprises air guiding stiffeners arranged in the longitudinal direction and air guiding stiffeners arranged in the transverse direction, connecting members joining the stiffeners together into an air distribution circuit. The circuit layout is thus optimized.

According to another feature, the air distribution circuit comprises at least one air bleed tap in contact with the outside of the cowl, at least one ventilation accessory situated inside the cowl, the ventilation accessory being connected with the air bleed tap, the ventilation accessory being able to cause the air to circulate in the distribution circuit. The ventilation accessory comprises, for example, a blower driven by an electric motor or any other energy source, preferably fixed to the internal face of the wall of the cowl. The ventilation accessory is of benefit during the critical phases such as when the engine is not running or when taxiing on the ground. It therefore allows a sufficient ventilation air flow to be generated. According to one particular mode of use, the blower is controlled in such a way that it operates only when needed.

Finally, in order to diffuse the air over the equipment that needs to be ventilated, a part of the stiffeners forming air guide ducts comprises air ejection means, such as perforations. This makes it possible to dispense with the need to mount an air diffuser at each of the items of equipment that needs to be air cooled. This also makes it possible to overcome potential local malfunctioning of the air diffusers and thus make maintenance operations easier.

In the context of the invention, the equipment of mention is, preferably, actuators, notably actuators that operate the thrust reverser members.

The invention will be better understood, and other objects, details, features and advantages thereof will become more clearly apparent from reading the detailed explanatory description which follows, of one embodiment of the invention given by way of purely illustrative and nonlimiting example with reference to the attached schematic drawings.

BRIEF DESCRIPTION OF THE DRAWINGS

FIG. 1 is a schematic depiction in longitudinal section of a propulsion unit equipped with a bypass engine for aircraft propulsion, FIG. 2 shows the internal face of a cowl and schematically illustrates the air distribution circuit according to the invention, FIG. 3 shows in cross section a conventional S-shaped stiffener profile, FIG. 4 shows in cross section an Ω-shaped stiffener profile according to the invention, FIG. 5 schematically illustrates the principle of ejecting air toward an item of equipment.

DETAILED DESCRIPTION OF THE DRAWINGS

Aircraft are equipped, in order to propel them, with one or more engines such as multiple-flow turbojet engines.

FIG. 1 is a schematic depiction in longitudinal section of a bypass turbojet engine 1 and of the nacelle that envelops it. The nacelle is formed of the air intake 11 upstream, of a cowl 20 referred to as a fan cowl and of an annular nozzle 23; the nozzle 23 possibly incorporates the mechanism for reversing the thrust of the secondary, bypass, stream. Upstream and downstream are defined with reference to the direction in which the air flows through the engine.

The engine, inside the nacelle, comprises a fan 13, mounted so that it can rotate inside an annular case 18 on which the nacelle rests. Downstream of the fan, the air flow path is split into two concentric flow paths. Primary flow path and secondary, bypass, flow path. In the primary flow path 14, the air flow is successively compressed again, burnt in the combustion chamber, and expanded through the fan and compressor drive turbines, not depicted. The secondary, bypass, flow is guided along the secondary, bypass, flow path 16 and in this instance ejected without being mixed with the primary flow.

The annular case 18 is in two parts: a first part, upstream, forms the fan case 18a and a second part, downstream of the first, comprises the outer shell ring 18b of the case 19. This case, which in the field of aero engines is referred to as the intermediate case, notably supports the engine upstream bearings. The fan case 18a is bolted to an annular flange of the outer shell ring 18b of the intermediate case. The air intake 11 upstream is fixed to a flange of the fan case 18a. Downstream, the downstream part of the nacelle, namely the nozzle 23, rests against the intermediate case, on the shell ring 18b thereof. In the fan zone 12 defined between the air intake 11 and the secondary nozzle 23, the cowl 20 envelops the annular case 18. It aerodynamically connects the outer walls of the air intake and of the secondary nozzle 23. Radially between the annular case 18 and the cowl 20 is an annular space 22 that can house various items of equipment 24 such as the actuators that operate the thrust reverser mechanism or even onboard processers of the EEC (electronic engine control) type.

To protect the equipment it is necessary to ventilate it in order to prevent it from heating up and ensure that it operates correctly.

FIG. 2 depicts the internal face of the cowl and schematically illustrates an air distribution circuit 2 according to the invention. This air distribution circuit 2 has the function of ventilating the various equipment items 24 housed in the space 22. The air is tapped from outside using a scoop 28. This scoop 28 is connected to a ventilation means 30. The function of this ventilation means 30 is to circulate the air through the air distribution circuit 2. This circuit 2 is, according to the invention, made up of stiffener elements 32 which are arranged to form air guide ducts and which are joined together in an airtight manner. It comprises stiffeners arranged circumferentially inside the cowl and stiffeners arranged longitudinally.

FIG. 3 schematically illustrates a simple S-shaped stiffener profile. This S-shaped profile is the profile conventionally used to reinforce the structure of a cowl 20. These simple stiffeners 33 are usually oriented some of them circumferentially and others parallel to the axis 10 of the multiple-flow engine 1. These simple stiffeners 33 perform a strengthening function only. They are attached to the wall 34 of the cowl 20 on the internal face via their flange 35. They are attached using rivets, bonding or some other means.

FIG. 4 schematically illustrates an omega (Ω) shaped stiffener profile. This Ω-shaped profile is the profile used to strengthen the structure of the cowl 20. These second stiffeners 32 are also oriented some of them circumferentially and others parallel to the axis 10 of the multiple flow engine 1. They take the place of simple stiffeners 33. However, in addition to performing the function of reinforcing the walls, these stiffeners 32 form air guide ducts. They comprise a central air guiding part. They are attached to the internal wall 34 of the cowl 20 by the two lateral flanges 36 of their Ω shape. The central air guiding part forms an air duct with the part of the wall 34. The lateral flanges are attached to the wall 34 by rivets, bonding or some other means.

This Ω-shaped profile allows these stiffeners 32 to be attached to the internal wall 34 of the cowl 20 while at the same time providing airtightness for a fluid passing along inside the chamber formed between the three internal walls of the stiffener 32 and the wall 34 of the cowl 20. It is conceivable, within the context of the invention, to use any other stiffener profile that provides this same level of airtightness when mounted on the internal wall 34 of the cowl 20.

FIG. 5 schematically illustrates the principle of ejecting air toward a piece of equipment 24. The air guide duct forming stiffeners 32 are perforated with a view to distributing the air toward the equipment 24 that is to be ventilated.

It should be noted that alternative forms of embodiment are of course possible.

What is claimed is:

1. An aircraft propulsion engine comprising:
   a case;
   a cowl forming part of a nacelle of the engine, the cowl being designed to at least partially surround said case leaving a space between the cowl and the case; and
   at least one piece of equipment which is mounted in the space and extends along an axis of said engine,
   wherein the cowl comprises a wall and wall stiffeners fixed to an internal face of the wall,
   wherein at least a part of the stiffeners is arranged to form air guide ducts, said air guide ducts being assembled into an air distribution system to ventilate said at least one piece of equipment,
   wherein the air distribution system comprises air guiding stiffeners arranged in a longitudinal direction and air guiding stiffeners arranged in a transverse direction, connecting members joining the stiffeners together into an air distribution circuit,
   wherein the air distribution system comprises an air bleed tap in contact with an outside of said cowl, a ventilation accessory situated inside said cowl, said ventilation accessory being connected with said bleed tap, said ventilation accessory being able to cause the air to circulate in said air distribution system, wherein the ventilation accessory comprises a blower which is fixed to the internal face of the wall of the cowl, wherein the air distribution circuit is made up of stiffener elements which are arranged to form air guide ducts and which are joined together in an airtight manner, and wherein a part of said stiffeners forming air guide ducts comprises perforations for ventilating said equipment.

2. The engine as claimed in claim 1, wherein said stiffeners have a cross section with an air guiding part and flanges for attaching to the wall.

3. The engine as claimed in claim 2, wherein the air guiding part collaborates with the wall to form an air guide duct.

4. The engine as claimed in claim 3, wherein said stiffeners have an omega-shaped cross section with a central air-guiding part and lateral flanges for attaching to the wall.

5. The engine as claimed in claim 1, wherein the case is a fan case.

6. The engine as claimed in claim 1, wherein the at least one piece of equipment is an actuator.

7. The engine as claimed in claim 6, wherein the actuator operates a thrust reverser member.

\* \* \* \* \*